US006292069B1

(12) United States Patent
Michaels et al.

(10) Patent No.: US 6,292,069 B1
(45) Date of Patent: Sep. 18, 2001

(54) LOOSELY COUPLED ROTARY TRANSFORMER HAVING RESONANT CIRCUIT

(75) Inventors: Paul A. Michaels, Livonia; Irvin B. Rea, Royal Oak, both of MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/395,817

(22) Filed: Sep. 14, 1999

(51) Int. Cl.[7] .................................................... B60R 21/32

(52) U.S. Cl. ...................... 333/24 R; 280/735; 307/10.1; 340/646

(58) Field of Search ................................ 360/64, 67, 27, 360/108; 324/502, 238; 378/15; 370/112; 73/510, 531; 318/34; 333/24 R; 280/735; 307/10.1; 340/646

(56) References Cited

U.S. PATENT DOCUMENTS 5,594,176 * 1/1997 Kiefer .................................... 73/623
5,608,771 * 3/1997 Steigerwald ........................... 378/15
5,636,863 6/1997 Reid et al. ........................ 340/436 X
5,906,392 5/1999 Reid et al. ........................ 340/436 X
6,133,741 * 10/2000 Mattes ................................. 324/502
6,175,461 * 1/2001 Fukuda .................................. 360/64

OTHER PUBLICATIONS

SAE document "Contactless Air–Bag Firing and Signal Transmission on the Steering Wheel with an Inductive Contact Unit" by Erich Zabler, Anton Dukart & Thomas Herrmann, Robert Bosch GmbH, 1998.

Martin Scheck document "Dynamic simulation of a transformer for a contactless clockspring design used for functional information exchange of airbag, cruise control and other systems.", 1998.

* cited by examiner

*Primary Examiner*—Justin P. Bettendorf
*Assistant Examiner*—Dean Takaoka
(74) *Attorney, Agent, or Firm*—Rader, Fishman & Grauer PLLC

(57) ABSTRACT

A loosely coupled rotary transformer includes a resonant circuit, such as a resonating capacitor connected to a power MOS transistor, coupled across the primary coil of the transformer. The resonant circuit is connected and disconnected from the transformer during a power transfer mode and a data transfer mode, respectively. During the power transfer mode, stored energy in the leakage inductance of the primary coil is used for power coupling, via the resonant circuit, instead of being dissipated as heat. The resonant circuit is disconnected from the rotary transformer during the data transfer mode to maximize bandwidth for two-way data transfer between the primary and secondary sides of the transformer. Including the resonant circuit in the loosely coupled transformer optimizes data and power transfer without requiring the use of high-cost, high-efficiency magnetic structures in the core of the transformer.

12 Claims, 2 Drawing Sheets

LOOSELY COUPLED ROTARY TRANSFORMER HAVING RESONANT CIRCUIT

TECHNICAL FIELD

The present invention is directed to rotary transformers, and more particularly to loosely coupled rotary transformers that transfer both power and data between two structures.

BACKGROUND ART

Rotary transformers, and particularly loosely coupled power transformers, are often used for transmitting both data and power between two structures that rotate relative to one another, such as between a vehicle tire and its corresponding wheel axle in a tire pressure sensor system, or for coupling data and power to a steering wheel. As is known in the art, loosely coupled power transformers do not conduct power efficiently between the primary and secondary of the transformer. Instead, a part of the input current into the primary coil stores energy in the leakage inductance of the coil. Prior art structures often include a Zener diode across the primary to absorb the energy of the voltage spike that occurs in the transformer when the current to the primary coil is turned off. More particularly, the Zener diode will conduct current before the drive transistor in the primary side breaks down. However, under this approach, the stored energy is dissipated as heat, thereby wasting the energy built up in the primary coil's leakage inductance and lowering the power coupling efficiency of the transformer.

To overcome this problem, conventional rotary transformer designs tend to focus on methods of increasing the coupling efficiency by constructing a magnetically efficient structure for power transmission, such as by using more expensive, high-efficiency core materials, and then adding a complex load impedance mechanism for providing limited two-way communication through the transformer. This results in an overly complicated structure requiring close mechanical tolerances, which increases the manufacturing cost of the system. Further, the bandwidth for these structures tends to be relatively narrow, which limits the amount of data or the speed at which data can be transmitted between the primary and secondary sides of the transformer.

SUMMARY OF THE INVENTION

Accordingly, the present invention is directed to a loosely coupled rotary transformer structure that includes a resonant circuit, such as a resonating capacitor and a drive transistor coupled, to the primary coil in the transformer. In one embodiment, the drive transistor connects the capacitor to the transformer during a power transfer mode and disconnects the capacitor during a data transfer mode. As a result, the energy stored in the primary coil's leakage inductance is coupled to the capacitor when the drive transistor is turned off, allowing the energy to continue being coupled to the secondary side of the transformer. Thus, the inventive structure uses the stored energy in the primary leakage inductance for coupling instead of wasting the energy as dissipated heat, thereby increasing power coupling efficiency. Also, by disconnecting the resonating capacitor during the data transfer mode, the inventive transformer structure avoids the decrease in bandwidth that would ordinarily be caused by the resonating capacitor if it remained connected to the circuit. Preferably, the transformer continuously cycles between the data transfer mode and the power transfer mode via time-sequenced multiplexing.

An embodiment of the invention also includes a full wave rectifier coupled to the secondary coil of the transformer to extract the power being coupled to the secondary side. The rotary transformer according to the invention therefore combines efficient power transfer characteristics with a wide bandwidth for two-way data transfer while eliminating the need to use high-cost, high-efficiency magnetic structures in the transformer; the inventive structure is equally as effective for air core transformers as well as for rotary transformers using a high efficiency magnetic structure.

DETAILED DESCRIPTION OF THE PREFERRED EMBODIMENTS

Figure 1:
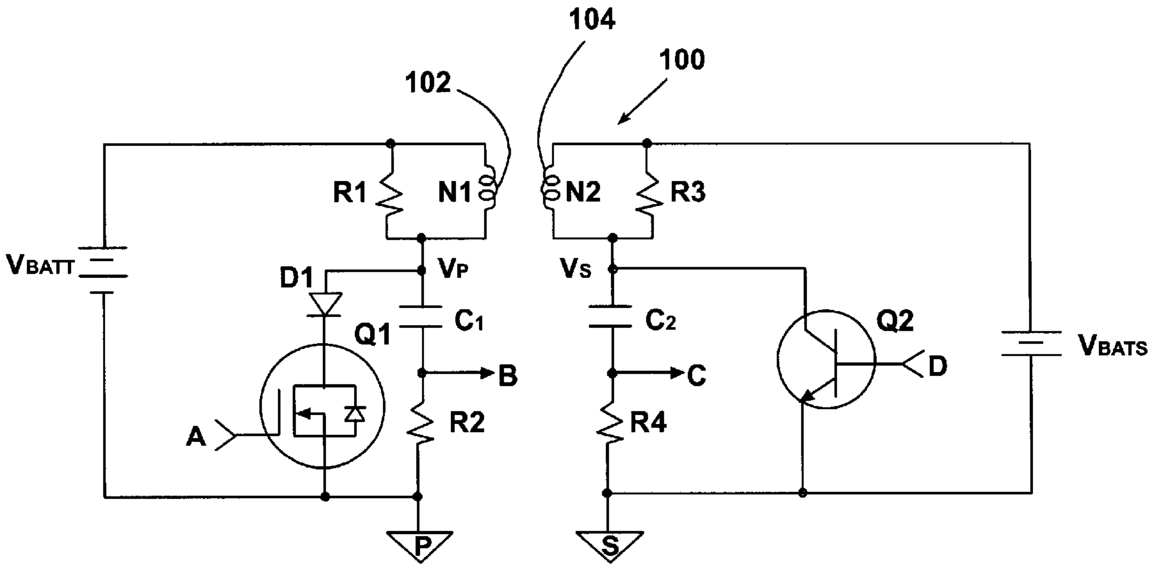
FIG. 1 illustrates a rotary transformer according to the present invention operated in a two-way data transfer mode.

FIG. 1 shows a rotary transformer 100 used in a two-way data transfer mode, in which data is transferred between two structures (not shown), such as two components of a vehicle steering wheel. The transformer 100 has a primary coil 102 and a secondary coil 104. Resistors R1 and R3 are placed across the primary coil 102 and secondary coil 104, respectively, to control any ringing produced by the transformer 100 due to the loose coupling. Typically, the resistance values of resistors R1 and R3 are reduced until the primary and secondary resonant circuits formed by the transformer's 100 leakage inductance and stray capacitance are critically damped. As a result, the transformer's 100 bandwidth is very large, allowing the invention to transmit digitally controlled pulse trains as well as various limited bandwidth sine wave coding schemes, such as frequency-shift keying (FSK) or other comparable schemes. In other words, the large bandwidth produced by the structure in FIG. 1 allows large amounts of virtually any data type to be transmitted between the primary and secondary sides, which is advantageous in current automotive applications.

Figure 3A:
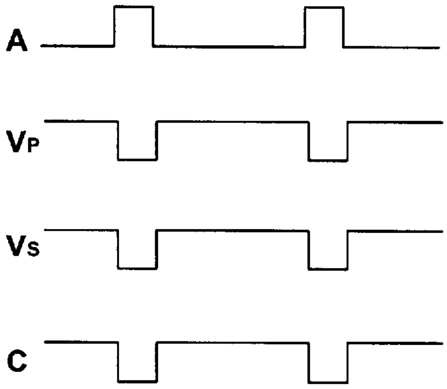
FIGS. 3*a* and 3*b* illustrate waveforms at the primary side and the secondary side, respectively, of the inventive rotary transformer during the data transfer mode.
Figure 3B:
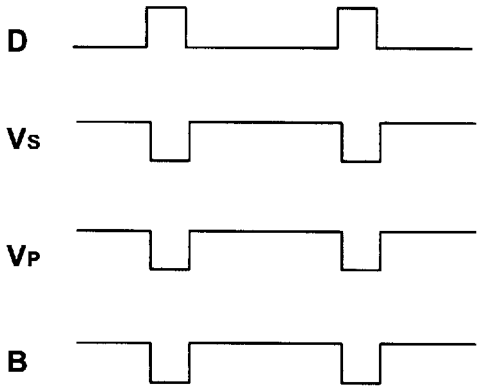

FIGS. 3*a* and 3*b* illustrate the waveforms associated with a typical power transfer mode operation in the inventive rotary transformer 100 structure. A positive pulse stream A is input into the gate of transistor Q1 on the primary side of the transformer 100, which drops primary coil voltage V2 to primary ground P. Although FIG. 1 shows specifically an N-channel MOS driver for Q1, transistor Q1 can be any type of transistor, such as a bipolar driver, without departing from the scope of the invention. Pulse stream A, shown in FIG. 3*a,* generates an inverted pulse, Vp, at the primary coil 102, which is coupled in the transformer 100 to the secondary coil 104, producing waveform Vs as shown in FIG. 3*a*. Waveform Vs is coupled through the network formed by C2 and R4 on the secondary side of the transformer to output waveform C, as shown in FIG. 3*a*. Voltage waveform Vs on the secondary side of the transformer 100, as shown in FIG. 3*a,* has an ideal (theoretical) amplitude of Vs=(N2/N1)*Vp, N1 being the number of turns in the primary coil 102 and N2 being the number of turns in the secondary coil 104. Because the transformer 100 is loosely coupled, however, the actual amplitude of Vs will usually be smaller than the theoretical amplitude. primary coil 102, which is coupled in the transformer 100 to the secondary coil 104, producing waveform Vs as shown in FIG. 3*a*. Waveform Vp is coupled through the network formed by C1 and R2 on the primary side of the transformer, while waveform Vs is coupled through the network formed by C2 and R4 on the secondary side of the transformer to output waveform C, as shown in FIG. 3*a*. Voltage waveform Vs on the secondary side of the transformer 100, as shown in FIG. 3*a*, has an ideal (theoretical) amplitude of Vs=(N2/N1)*Vp, N1 being the number of turns in the primary coil 102 and N2 being the number of turns in the secondary coil 104. Because the transformer 100 is loosely coupled, however, the actual amplitude of Vs will usually be smaller than the theoretical amplitude.

In a similar manner, as shown in the waveforms of FIG. 3*b*, applying a signal D, with respect to the secondary ground S, to the base of transistor Q2 in the secondary side results in a similar inverted signal appearing at B with an ideal amplitude C=–(N1/N2)*D with respect to the primary ground P. Further, as shown in FIG. 1, a battery VBatt supplies the energy for the primary side of the transformer 100, while VBatS supplies the energy for the secondary side. VBatS can be obtained from energy transmitted via pulse stream D or obtained from a power transfer mode, which will be explained in further detail below.

Figure 2:
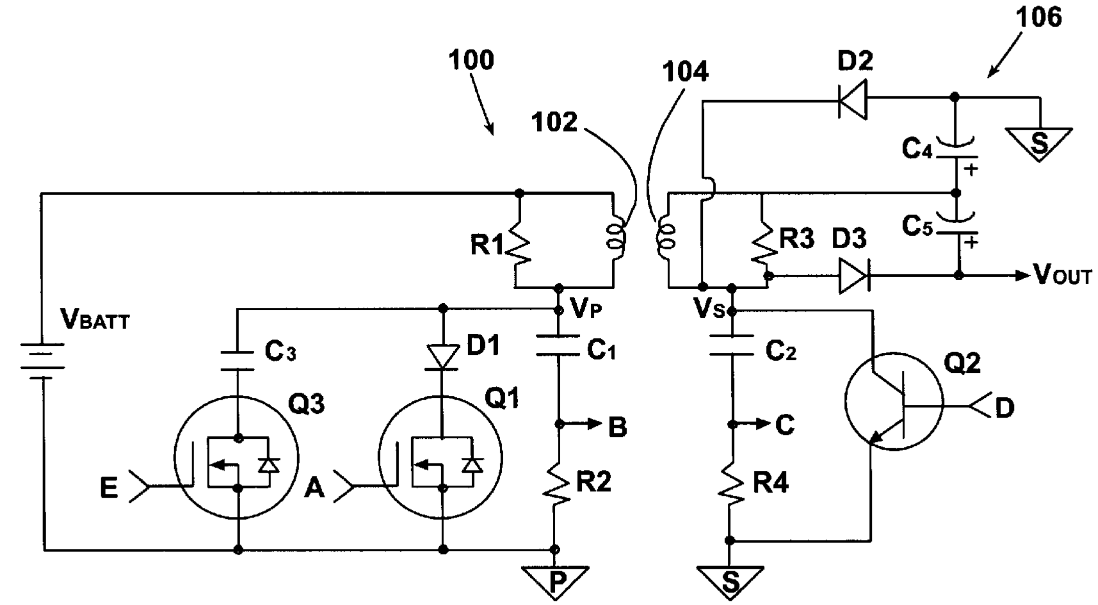
FIG. 2 illustrates the inventive rotary transformer operated in a power transfer mode.

FIG. 2 illustrates the inventive rotary transformer 100 when it is used in a power transfer mode, where the objective is to couple power across the transformer 100, from the primary side to the secondary side. Because a loosely coupled rotary transformer has, by definition, a low coupling coefficient, much of the applied power is stored in the primary coil's leakage inductance and is not coupled to the secondary side. In pulse mode applications, when the primary drive transistor Q1 is turned off, the stored energy in the primary leakage inductance of the primary coil 102 normally causes the primary voltage Vp to rise until a component in the primary side breaks down or until the energy is dissipated as heat via a Zener diode, as explained above.

The inventive circuit avoids the voltage control problems experienced by prior art circuits by placing a resonating capacitor C3 across the primary coil 102 to create a resonant circuit. As a result, the stored energy in the primary coil's 102 leakage inductance is coupled to the resonating capacitor C3 when the drive transistor Q3 is turned off. In doing so, the primary side continues to couple energy to the secondary side after the drive transistor Q3 is turned off, increasing the power coupling efficiency and decreasing the overall amount of heat generated by the transformer 100.

Figure 4:
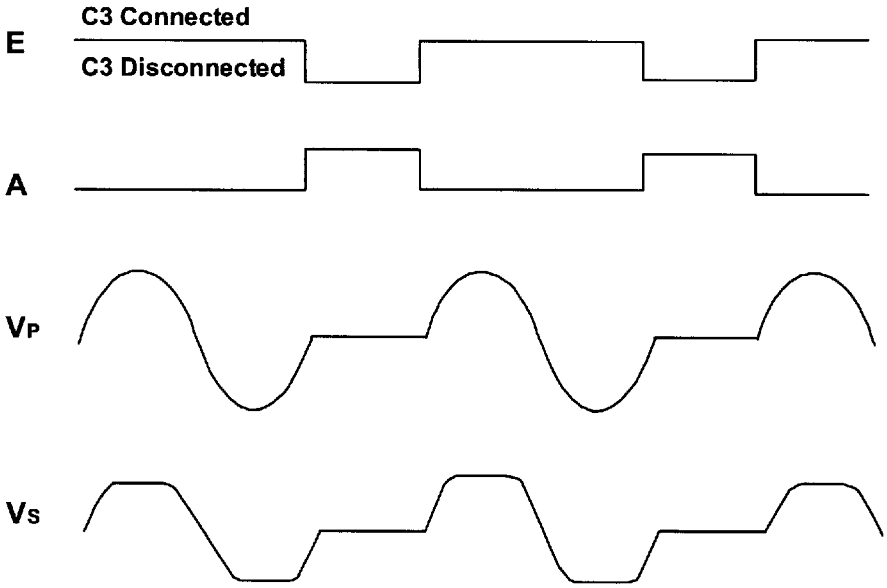
FIG. 4 illustrates waveforms generated during the power transfer mode of the inventive rotary transformer.

The preferred transformer structure 100, as shown in FIG. 2, also includes a diode D1 connected to the collector of the transistor Q1, which is shown in the figure as an n-channel MOS driver. The diode D1 has a negligible effect on the data transfer and permits the resonant waveform Vp to go below ground, as illustrated in FIG. 4, thus extending the period of active power coupling between the primary and secondary sides of the transformer 100. The increase in the power coupling time generally increases the overall power efficiency enough to more than compensate for the additional loss due to the forward voltage drop across diode D1. Note that if transistor Q1 is a bipolar NPN transistor rather than an n-channel MOS driver as described above, diode D1 is not needed provided that the collector swing of the bipolar NPN transistor is less than its base-emitter breakdown voltage.

As can be seen by studying the circuit shown in FIG. 2 and the waveforms of FIG. 4, resonating capacitor C3 is disconnected by turning drive transistor Q3 off whenever transistor Q1 is turned on. As a result, drive transistor Q1 does not have to supply any current to resonating capacitor C3, allowing all of the drive current to go to the transformer 100. When the drive transistor Q3 is turned off, the stored energy in the primary leakage inductance resonantly couples the resonating capacitor C3 to the transformer 100 and then moves back to the primary leakage inductance for continuous power coupling with the secondary side. In other words, placing the resonating capacitor C3, rather than a Zener diode, across the primary coil 102 allows the energy stored in the primary leakage inductance of the coil 102 to be used for power coupling rather than wasted as dissipated heat. Note that power MOS transistors can conduct in either direction, a function that is necessary for resonating capacitor C3 to be effective as a resonating capacitor in the illustrated embodiment. If a bipolar NPN transistor were to be used instead of the power MOS transistor Q3, a diode would need to be placed between the collector and emitter terminals of the bipolar NPN transistor for the circuit to function in the same manner as a circuit containing the power MOS transistor.

To extract the power being coupled to the secondary side, a full wave rectifier 106 is connected to the transformer during the power transfer mode, as shown in FIG. 2. The full wave rectifier includes diodes D2 and D3 and capacitors C4 and C5. A rectifier output Vout can be obtained at the junction between the diode D3 and capacitor C5. The voltage at the junction of C4 and C5 is the equivalent to the battery source VBatS shown in FIG. 1.

Resonating capacitor C3 increases the power coupling efficiency of the inventive transformer 100. However, the resonating capacitor C3 tends to limit the bandwidth of the data transfer to an undesirably low level. To avoid this problem, the invention preferably time-multiplexes the data and the power modes, continuously switching between the two modes to provide both efficient power transfer and a wide bandwidth for two-way data transfer. More particularly, control voltage E is input into drive transistor Q3, turning drive transistor Q3 on and off to connect and disconnect resonating capacitor C3 and switch the transformer 100 between operating in the power transfer mode for a fixed time period, e.g. 5 ms, and in the data mode for a fixed time period, e.g. 500 μs. The transformer 100 preferably cycles continuously between the two modes. The bit rate and/or the duration of the data transfer mode can be modified in any known manner to optimize the amount of data transferred between the primary and secondary sides. For example, using a 100 kHz data rate (10 μs period) transfers 50 bits of data between the primary side and the secondary side in 500 μs. Experimental studies with a low-cost air core transformer show that data bit rates over 1 MHz are possible in the inventive circuit. Furthermore, inserting a 500 μs data transfer period once every 5 ms of power transfer time reduces the power mode duty factor by only 10%. Depending on the particular application in which the inventive transformer circuit is used, the length of the data transfer period can be smaller than 0.1% of the power transfer period.

In the illustrated embodiment, when control voltage E is high, resonating capacitor C3 is connected to the transformer 100 to operate the transformer 100 in the power transfer mode. To switch the transformer 100 operation into the data transfer mode, control voltage E is dropped to the primary ground GndP, disconnecting resonating capacitor C3 from the transformer 100 to obtain the circuit shown in FIG. 1.

As a result, the inventive transformer circuit can obtain both good power transfer and data transfer without requiring specialized, higher-cost magnetic materials, allowing the inventive circuit to be manufactured with lower-cost, easily available air core transformers. More particularly, including a resonant circuit across a primary coil in a loosely coupled transformer allows energy stored in the leakage inductance of the primary coil to be coupled to the secondary side rather than being wasted as dissipated heat. Further, the invention can switch between power transfer and data transfer modes by simply connecting and disconnecting the resonant circuit, making the inventive structure much simpler than known structures using complex load impedance mechanisms for generating data transfer capabilities in a transformer.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A rotary transformer, comprising:

a primary coil;

a secondary coil;

a resonant circuit coupled to the primary coil, wherein stored energy in a leakage inductance in the primary coil is transferred to the secondary coil via the resonant circuit, the resonant circuit including means for connecting the resonant circuit to the primary coil during a power transfer mode and disconnecting the resonant circuit from the primary coil during a data transfer mode.

2. The rotary transformer of claim 1, wherein the rotary transformer is an air core transformer.

3. The rotary transformer of claim 1, wherein the resonant circuit includes:

a resonating capacitor connected to the primary coil; and a drive transistor connected to the resonating capacitor, wherein a control voltage input to the drive transistor turns the drive transistor on and off to connect and disconnect the resonating capacitor, respectively, and thereby connect and disconnect the resonant circuit from the primary coil.

4. The rotary transformer of claim 3, wherein the drive transistor is a MOS driver.

5. The rotary transformer of claim 3, wherein the drive transistor is a bipolar driver having a collector terminal and an emitter terminal, and wherein the rotary transformer further comprises a diode connected between the collector and emitter terminals of the bipolar driver.

6. The rotary transformer of claim 1, further comprising a full-wave rectifier coupled to the secondary coil.

7. The rotary transformer of claim 1, wherein the data transfer mode and the power transfer mode are time multiplexed such that the rotary transformer operates in the data transfer mode for a first time period and operates in the power transfer mode for a second time period, and wherein the rotary transformer continuously cycles between the data transfer mode and the power transfer mode.

8. A rotary transformer, comprising:

a primary coil;

a secondary coil;

a resonant circuit coupled to the primary coil, the resonant circuit including a capacitor connected to the primary coil and a drive transistor connected to the capacitor, wherein a control voltage input to the drive transistor turns the drive transistor on to connect the capacitor to the primary coil during a power transfer mode and turns the drive transistor off to disconnect the capacitor from the primary coil during a data transfer mode, thereby connecting and disconnecting the resonant circuit, and wherein stored energy in a leakage inductance in the primary coil is transferred to secondary coil via the resonant circuit; and a full-wave rectifier coupled to the secondary coil.

9. The rotary transformer of claim 8, wherein the rotary transformer is an air core transformer.

10. The rotary transformer of claim 8, wherein the drive transistor is a MOS driver.

11. The rotary transformer of claim 8, wherein the drive transistor is a bipolar driver having a collector terminal and an emitter terminal, and wherein the rotary transformer further comprises a diode connected between the collector and emitter terminals.

12. The rotary transformer of claim 8, wherein the data transfer mode and the power transfer mode are time multiplexed such that the rotary transformer operates in the data transfer mode for a first time period and operates in the power transfer mode for a second time period.

* * * * *